US005533959A

United States Patent [19]

Newman et al.

[11] Patent Number: 5,533,959

[45] Date of Patent: Jul. 9, 1996

[54] WIRELESS REMOTE MONITORS EMPLOYING REASSURANCE TONES

[75] Inventors: Perran V. L. Newman, Cambridge, England; Niel P. Zeller; Dwight D. Ifland, both of Littleton, Colo.

[73] Assignee: Gerry Baby Products Company, Thornton, Colo.

[21] Appl. No.: 199,943

[22] Filed: Feb. 22, 1994

[51] Int. Cl.$^6$ .................................................... C08B 23/00

[52] U.S. Cl. .............................................. 600/28; 340/573

[58] Field of Search ............................... 600/28; 128/715, 128/716, 721, 701, 732, 773, 903–905; 364/413.01–413.03; 340/575, 573, 539

[56] References Cited

U.S. PATENT DOCUMENTS

| | | | |
|---|---|---|---|
| 4,101,872 | 7/1978 | Pappas | 340/539 |
| 4,598,272 | 7/1986 | Cox | 340/539 |
| 4,622,544 | 11/1986 | Bially et al. | 340/636 |
| 4,785,291 | 11/1988 | Hawthorne | 340/573 |
| 4,899,135 | 2/1990 | Ghahariiran | 340/573 |
| 5,010,890 | 4/1991 | Pfohl et al. | 128/715 |
| 5,119,072 | 6/1992 | Hemingway | 340/573 |
| 5,307,051 | 4/1994 | Sedlmayr | 340/575 |

*Primary Examiner*—Angela D. Sykes
*Assistant Examiner*—Samuel Gilbert
*Attorney, Agent, or Firm*—Biebel & French

[57] ABSTRACT

A wireless audio monitoring system includes a reassurance tone generator for providing the user with assurance that a receiving unit is within range of the monitoring unit's transmitter and that both are operating properly. The reassurance signal is a brief audible tone transmitted at regular intervals by the monitoring unit to the receiving unit. The reassurance tone is either injected as sound into the monitoring unit's microphone, as an electronic signal into the microphone's amplifier or directly into the transmitter. A typical reassurance tone is a quarter-second long audible tone that occurs every ten seconds. At the receiving unit, the user has the option of either hearing or not hearing the reassurance tone by either eliminating the tone itself or by muting the loudspeaker during the time the reassurance tone is being received. Alternatively, the reassurance tone is turned on or off at the monitoring unit by means of a radio control signal sent from the receiving unit.

19 Claims, 7 Drawing Sheets

WIRELESS REMOTE MONITORS EMPLOYING REASSURANCE TONES

BACKGROUND OF THE INVENTION

This invention relates to a wireless remote sound monitor, such as a nursery monitor.

Wireless monitors, such as those used to monitor the sounds of a baby, typically include two components, namely, a monitoring unit and a receiving unit. The monitoring unit is placed near the child and includes a microphone for picking up the sounds made by the child and a transmitter for sending the audio sounds over a radio signal to the receiving unit, preferably a portable unit carried by the parent or supervising adult, which includes a loudspeaker. Either or both the monitoring unit and the receiving unit may be battery powered or they may be provided with a source of power from an external power adapter that is connected to a commercial power outlet. In some monitoring devices, a voice or sound actuated circuit is used to turn on the monitoring unit's transmitter only when the sound level is above some predetermined level. This is done to conserve power and increase battery life. When using sound actuation of the transmitter, however, even careful listening cannot reveal whether the system is operational. If the baby being monitored is silent, then the transmitter will be off, but from the parent's point of view, does that mean the baby is really silent or has there been a failure of the equipment?

There is clearly a need to provide a wireless monitoring system where the user can know with certainty that the equipment is operating properly, even when there is no sound being generated at the monitored location.

SUMMARY OF THE INVENTION

The present invention is directed to a wireless audio monitoring system that includes means for providing the user with reassurance that the receiving unit is within range of the monitoring unit and both are operating properly.

In the present invention, a reassurance signal, preferably a brief audible tone, is transmitted at regular intervals by the monitoring unit to the receiving unit. The reassurance tone may be either injected as sound into the monitoring unit's microphone or as an electronic signal into the microphone's amplifier or directly into the transmitter. A typical reassurance tone could be a quarter-second long audible tone that occurs every 10 seconds. At the receiving unit, the user has the option of either hearing or not hearing the reassurance tone.

In one embodiment of the invention, the reassurance tone is continuously being generated at the monitoring unit, while the receiving unit is provided with means for eliminating the tone itself or for muting the loudspeaker during the time the reassurance tone is being received. In other embodiment of the invention, the reassurance tone is turned on or off at the monitoring unit by means of a radio control signal sent from the receiving unit.

If the reassurance tone were heard on a continuous basis, it would become an annoyance after a short period of time, but on the other hand, the presence of the reassurance tone must be available to the user any time he or she desires to test the operation of the system. Thus, the present invention allows the user to select whether or not to hear the reassurance tone.

In the present invention, there are two preferred methods of generating a reassurance tone. In the first, the reassurance tone is generated towards the upper part of the normal audio communications frequency range, at approximately 3000 Hz. The receiver includes a highly selective notch filter that may be selectively switched into or out of the audio circuit, thus rejecting or passing the reassurance tone. A low-pass filter in the audio circuit suppress any harmonics of the reassurance tone and any other high frequency signals as well. The frequency of the notch filter is usually set first and then the frequency of the reassurance tone is adjusted to match that of the notch filter.

In the second embodiment, the reassurance tone may be set to any desired frequency. A control or hidden signal is then sent by the transmitter just before and during the time the reassurance tone is generated. The control signal is preferably a high frequency audio signal just above the range of the receiver's low-pass filter so that it will not heard. This control signal is detected and used selectively to mute the audio output signal. With this system, the audio output from the receiver's loudspeaker will be briefly muted at regular intervals whenever it is desired to remove the reassurance tone from the output. This system also works well with voice actuated transmitters since the receiver may be muted during the time when the receiver's squelch circuits are activated, thus eliminating the squelch tail.

It is therefore an object of this invention to provide an improved wireless monitoring system that provides means for confirming the proper operation of both the transmitting and receiving units through the use of brief reassurance tones which may be selectively heard or blocked, as desired by the user.

It is another object of this invention to provide a wireless monitoring system comprising a transmitter including an audio pickup device for monitoring ambient sounds, a tone generator for causing said transmitter to transmit an occasional audible reassurance tone, a receiver tuned to receive the ambient sounds monitored by said transmitter, and means for selectively controlling the monitoring of said reassurance tone.

It is a further object of this invention to provide a wireless sound monitoring system comprising a monitoring unit, said monitoring unit including a microphone, a transmitter connected to said microphone for broadcasting on a radio frequency signal ambient sounds picked up in the vicinity of the monitoring unit, and a tone generator for causing said transmitter to broadcast on said radio frequency signal short duration, fixed frequency reassurance tones, and a receiving unit, said receiving unit including a receiver tuned to the radio frequency signal from said transmitter, means within said receiver for detecting and converting the ambient sounds and reassurance tones contained in said radio frequency signal into an audio output signal, and means for selectively removing from said audio output signal said reassurance tones.

Other objects and advantages of the invention will be apparent from the following description, the accompanying drawings and the appended claims.

DESCRIPTION OF THE PREFERRED EMBODIMENT

Figure 1:
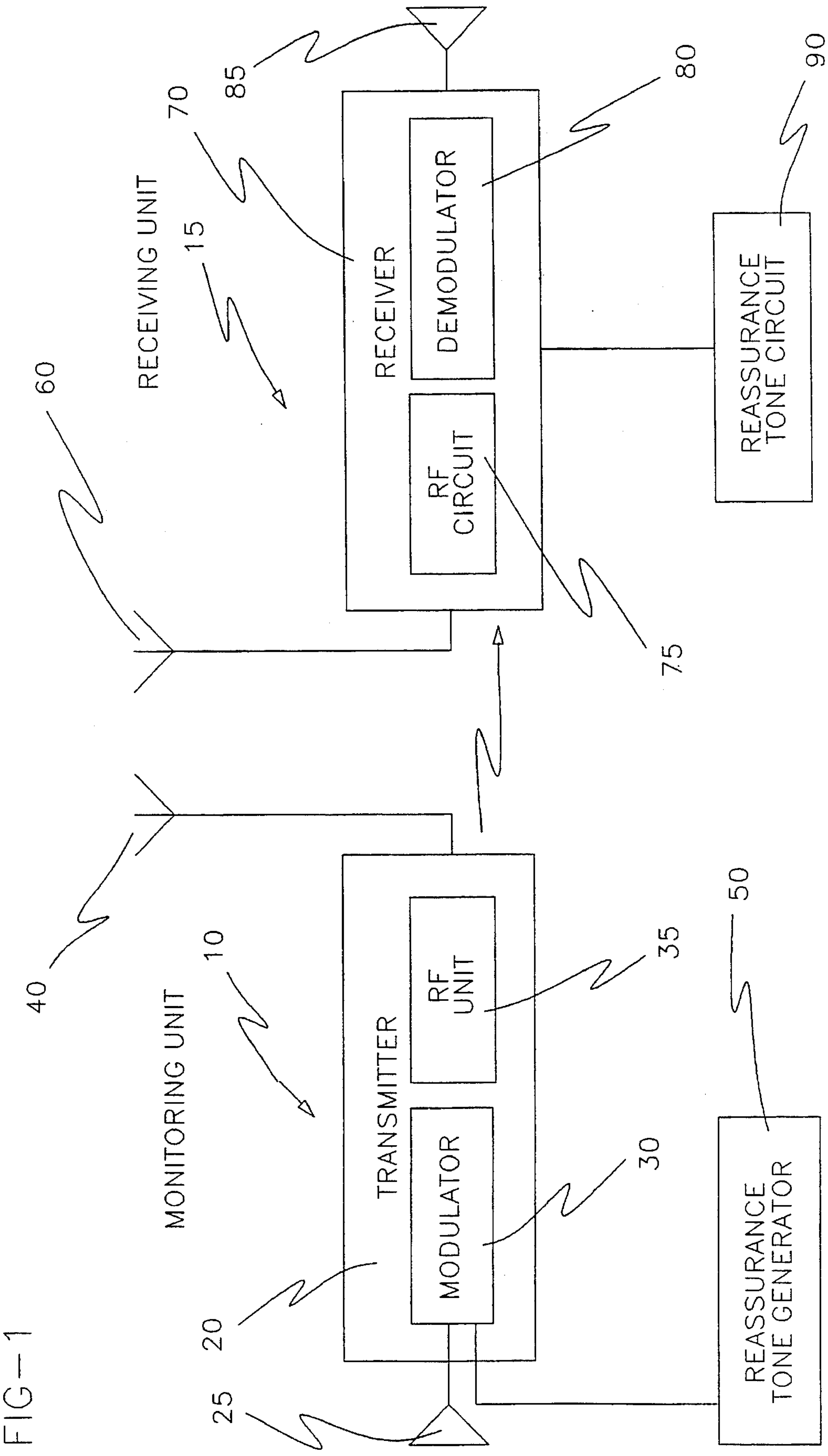
FIG. 1 is an electrical block diagram of the wireless monitoring system of this invention showing a transmitter provided with a reassurance tone generator and a receiver provided with a circuit for selectively muting or blocking the reassurance tones.

Referring now to the drawings which show preferred embodiments of the invention, and particularly to'the block diagram of FIG. 1, the wireless sound monitoring system includes a monitoring unit 10 and a receiving unit 15.

The monitoring unit includes a transmitter 20 and a microphone 25 for picking up the sound in the vicinity of the unit, such as the sounds a baby makes while in a nursery. The transmitter 20 is of conventional design and typically includes a modulator 30, a radio frequency (RF) generating unit 35 and an antenna 40. The modulator may be of the amplitude modulation type but is preferably a phase or frequency modulation device. A reassurance tone generator 50 has an output also connected to the modulator 30. Power to the transmitter 30 may be provided either by batteries or by means of an adaptor that is connected to a commercial source of electrical power.

The receiving unit 15 includes an antenna 60, a receiver 70 including an RF circuit 75 tuned to the frequency of the transmitter 20 and a demodulator 80 for converting the audio signals contained within the transmitted signal into an audio output signal which is connected to a loudspeaker 85.

A circuit, shown generally at 90, is provided for selectively removing the reassurance tone generated at the transmitter by the tone generator 50 from the audio output signal applied to the loudspeaker 85, as will be explained.

Figure 2:
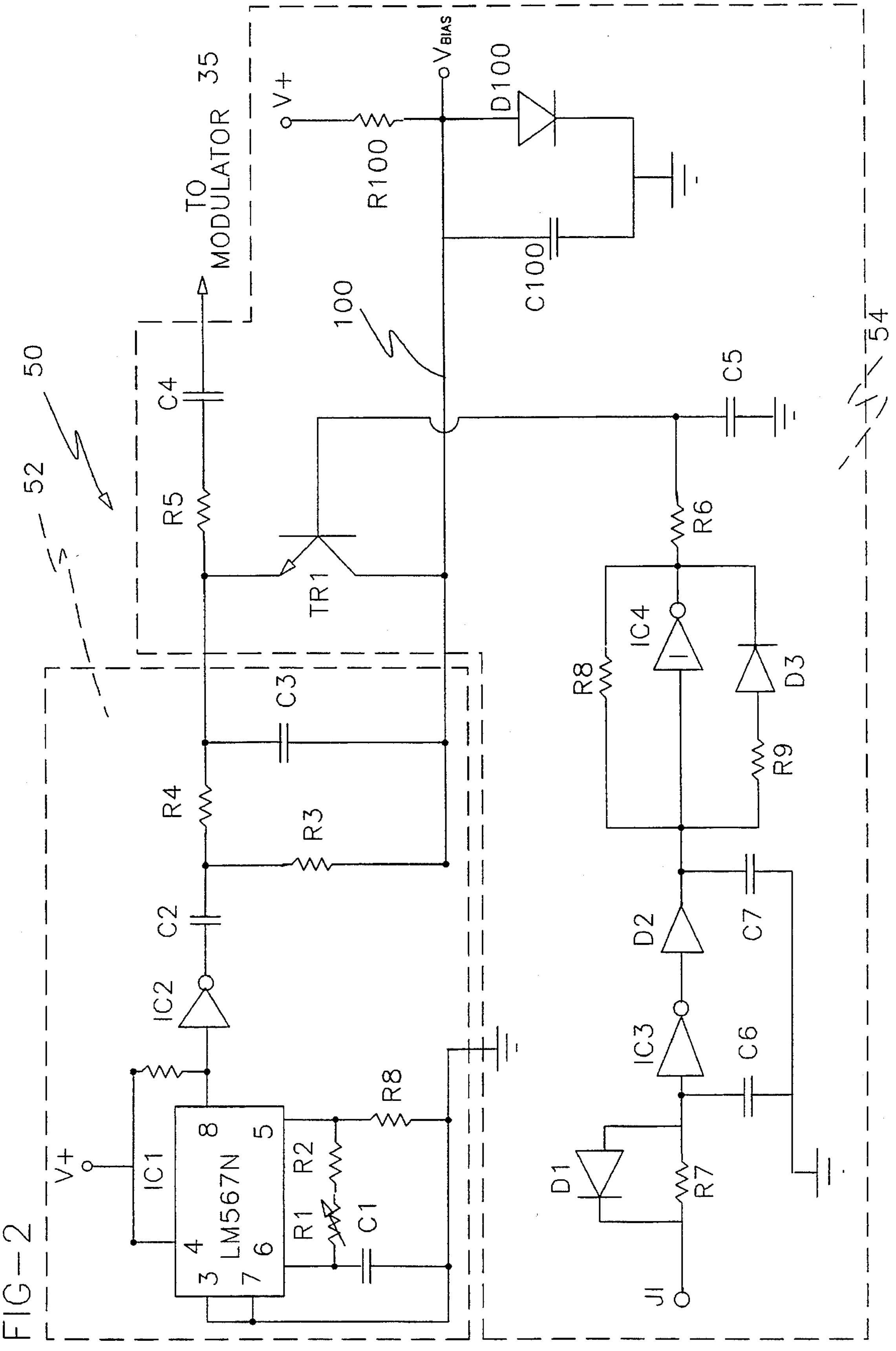
FIG. 2 is an electrical schematic diagram of a part of a transmitter showing one embodiment of a reassurance tone generator and timing circuit.

A variety of techniques may be used to generate the reassurance tone. In one preferred embodiment of the invention, as shown in FIG. 2, the reassurance tone generator 50 includes a continuous tone oscillator 52 and a timing or switching circuit 54. The oscillator generates a tone of approximately 3000 Hz, and the timing circuit causes that tone to be applied to the modulator 301 for approximately 0.2 seconds at 5 second intervals.

The tone oscillator 52 includes a commercially available oscillator circuit IC1, namely an LM567. This device generates a square wave whose frequency is largely independent of supply voltage V+ and temperature so long as the frequency determining components C1, R1 and R2 are stable. In the present invention, capacitor C1 is a low temperature coefficient polystyrene capacitor, resistor R2 is a metal film resistor and the trimmer resistor R1 is a ceramic type. Resistor R1 allows the frequency of the reassurance tone to be adjusted to precisely match a notch filter in the receiver as it is not practical to make the notch filter in the receiver adjustable. This adjustment step is practical method of calibrating the reassurance tone to the notch filter frequency.

While a sine wave reassurance tone generator would have a much lower harmonic content than the square wave generator shown, starting with a square wave and filtering out the higher harmonics is a simpler approach. The square wave output of IC1 is buffered by a logic inverter IC2 and DC restored by capacitor C2 and resistor R3. This restoration is to minimize any discontinuities in the output signal when clamp transistor TR1 operates. Such discontinuities effect the transmitter modulator and would therefore become audible at the receiver.

A low pass filter, including resistor R4 and capacitor C3, removes a substantial part of the harmonic spectrum of the original square wave, allowing the receiver's low pass filter to be more effective. Finally, the reassurance tone is passed to the transmitter modulator through amplitude determining resistor R5 and a blocking capacitor C4.

The timing circuit 54 includes a clamp transistor TR1 used in inverted mode to provide a saturated switch with a very low ON state voltage drop. Transistor TR1 clamps the reassurance tone to ground most of the time, releasing it through to the modulator for an ON time of approximately 0.2 seconds under the direction of a Schmitt inverter IC4 which is configured as an asymmetric astable multivibrator. The ON time for the reassurance tone is determined by capacitor C7 and resistor R8 while the OFF time is determined by capacitor C7 and resistor R9 (via diode D3).

Inverter IC3 and diode D2 are used to force the reassurance tone to a continuous ON state for a limited period of time after power is first applied to the circuit via power jack J1. When a positive voltage is first applied to J1, capacitor C6 charges slowly through resistor R7. The Schmitt inverter IC3 holds capacitor C7 high via diode D2. The output of inverter IC4 is therefore forced low for a period of time and the clamp transistor TR1 will remain off, thus allowing the reassurance tone to be sent continuously, until capacitor C6 charges. This technique gives time for the trimpot R1 to be adjusted so that the reassurance tone is matched to the notch filter in its companion receiver. In a production unit, the trimpot would be accessed via a hole in the case of the transmitter unit. The power jack J1 is connected to the normal external power input V+ for the device.

Thus, upon initial turn-on of the transmitter, the reassurance tone modulates the transmitter continuously for a short period of time sufficient for the frequency of the reassurance tone to be adjusted by maintenance personnel to match the frequency of the notch filter in the companion receiver.

Figure 3:
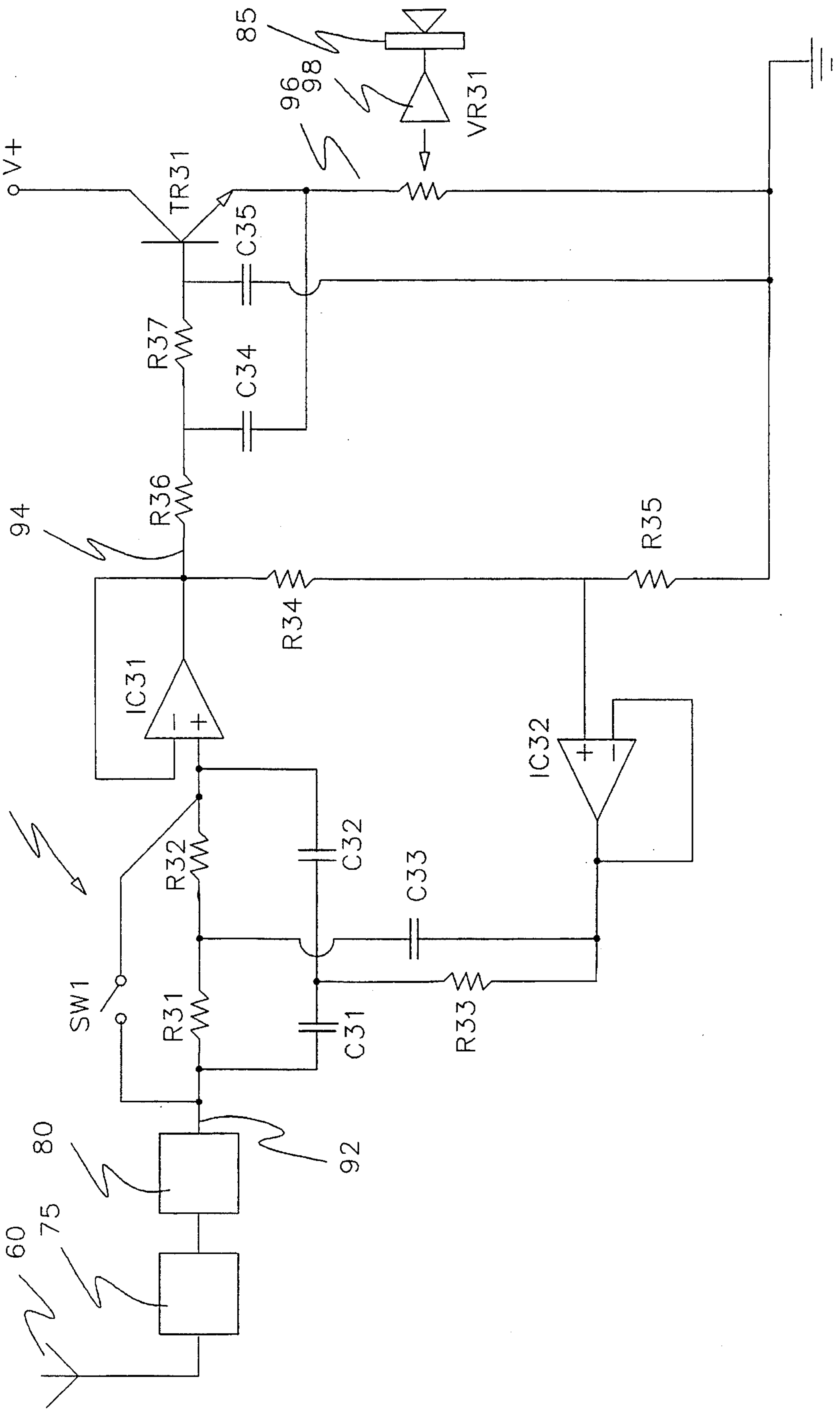
FIG. 3 is an electrical schematic diagram of a part of a receiver showing a notch filter for selectively muting the reassurance tone generated by the circuit shown in FIG. 2.

Referring now to FIG. 3, which is a combined block diagram and an electrical schematic diagram of the receiver 15, radio frequency energy from the monitoring unit 10 is received by antenna 60, amplified by radio frequency section 75, and applied to the demodulator circuit 80. In a preferred embodiment, the audio signals are frequency modulated, so the demodulator circuit 80 is typically a frequency discriminator. A circuit 90 is shown to remove the reassurance tone, when desired by the user. As shown in FIG. 3, a notch filter is used in this embodiment of the invention.

The output from the audio detector 80 at point 92 is typically a low level audio signal that includes both the ambient audio detected by microphone 25 and the intermittent reassurance tone with possibly some high frequency audio noise. The circuit shown in FIG. 3 is designed to remove the fundamental and harmonics of the reassurance tone and the high frequency noise.

Switch SW1 determines whether the reassurance tone is to be sent to the loudspeaker 85 or muted according to the desires of the user. When the switch SW1 is closed, the reassurance tone will not be removed but will be passed through directly to the loudspeaker 85. If the switch is open, then a notch filter will remove the reassurance tone.

The notch filter includes a first stage based upon a conventional "twin T" network. This is a well known configuration and by the correct selection of the ratio of resistors R34 and R35, a very deep notch can be produced at the desired frequency. In practice, R31=R32=2×R33 and C31=C32=0.05×C33. Typical component tolerance is ±1% and high stability components are required such as metal film resistors and polystyrene capacitors. Operational amplifiers IC31 and IC32 are configured as voltage followers and give the required high input and low output impedances.

The signal at point 94 is fundamentally the same as at point 92, except that a deep (typically a 30 to 40 dB) notch has been inserted in the audio spectrum, effectively eliminating the fundamental of the reassurance tone while leaving its harmonics.

The second stage of the filter is an active low pass filter. The corner frequency is related to the notch frequency so that maximum rejection of the harmonics of the notch frequency are obtained while minimal attenuation of the desired audio spectrum takes place. In the functional sample of the system a notch frequency of 3 kHz was chosen, so that its harmonics tend to lie above the useful audio band of frequencies. The low pass filter is configured to have a corner frequency of 3.5 kHz.

The values of R36, R37, C34 and C35 are chosen to give the desired low pass characteristic. Transistor TR31 provides a high input impedance and low output impedance at a fraction of the cost of an operational amplifier. If desired, there is no reason why the low pass filter cannot be a 3 or 4 stage design to increase rejection of any audible harmonics.

The signal at point 96 contains the required parts of the audio spectrum (typically 0–3.5 kHz), with the fundamental of the reassurance tone selectively rejected and any harmonics falling above 3.5 kHz also rejected. Further, any high frequency noise, such as intermediate frequency components generally present in an FM system, are also eliminated from the audio output. Point 96 feeds a conventional volume control VR31, audio amplifier 98 and loudspeaker 85.

Figure 4:
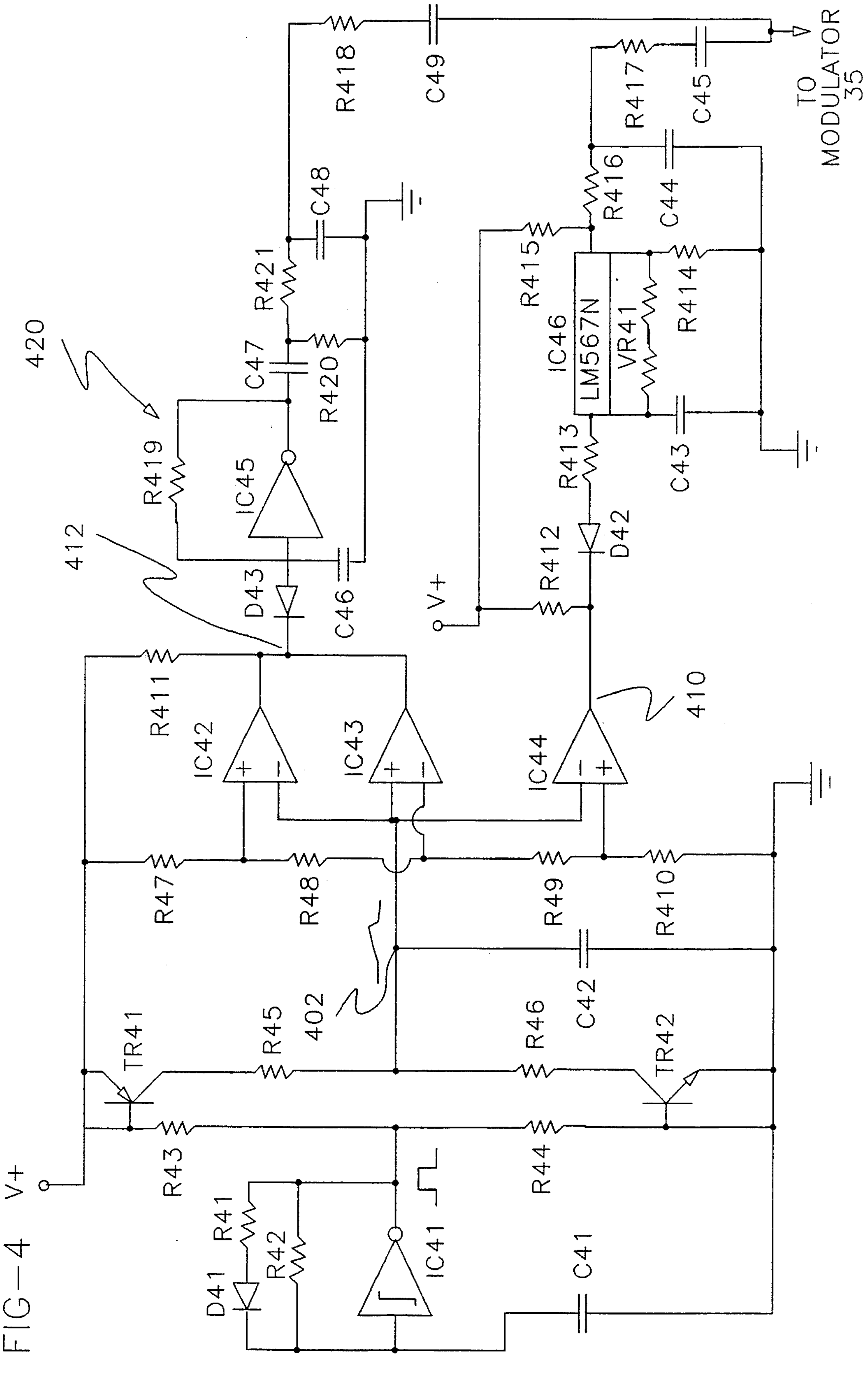
FIG. 4 is an electrical schematic diagram of a part of a transmitter used in another embodiment of the present invention wherein a pair of oscillators are employed, one for generating a reassurance tone in accordance with the present invention, the other for generating a hidden tone that will be used in the matching receiver for selectively blocking the reassurance tone.
Figure 5:
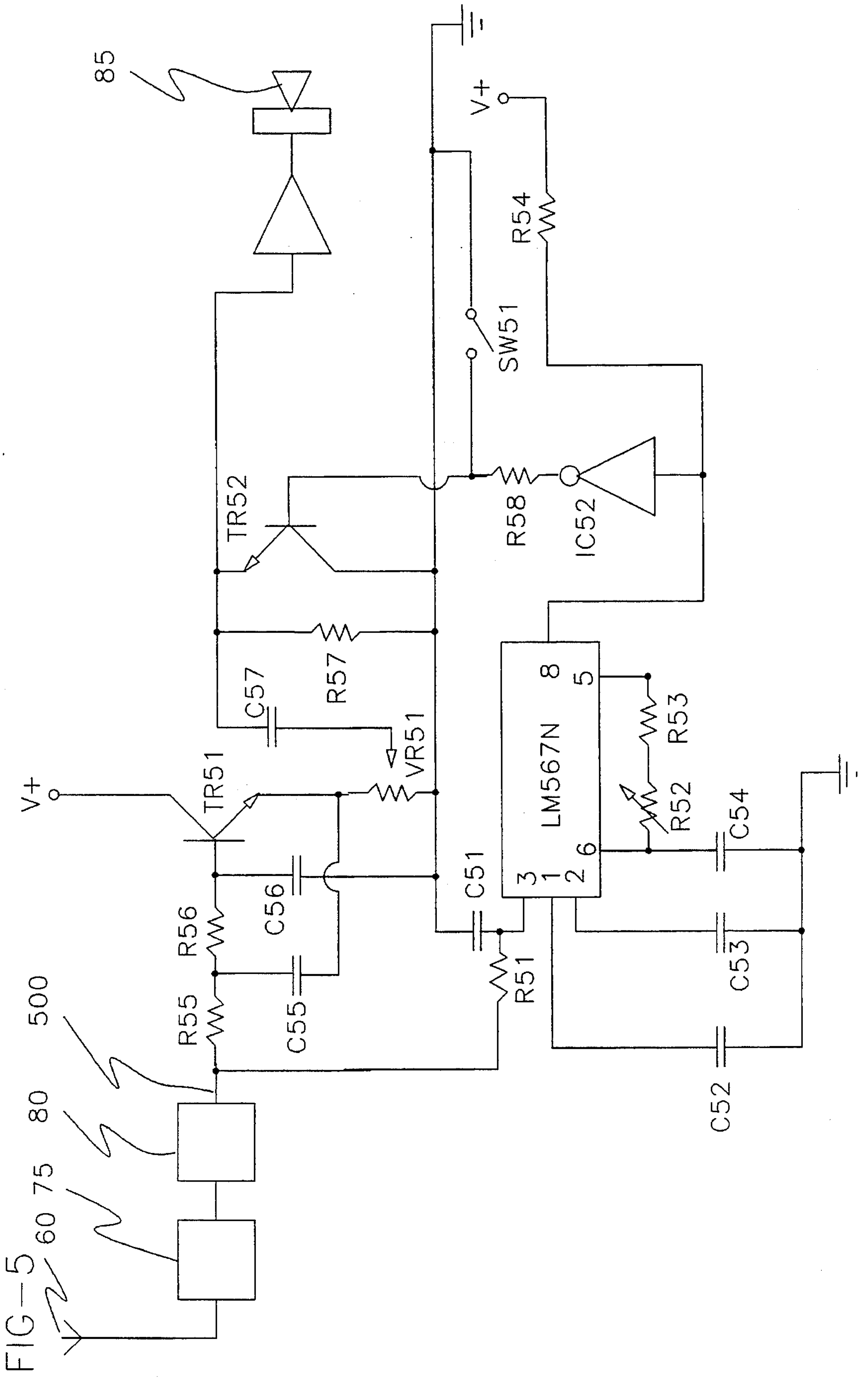
FIG. 5 is an electrical schematic diagram of a part of a receiver to be used with the transmitter of FIG. 4 wherein a detector is provided to detect the hidden tone and selectively mute the loudspeaker whenever the hidden tone is present.
Figure 5:
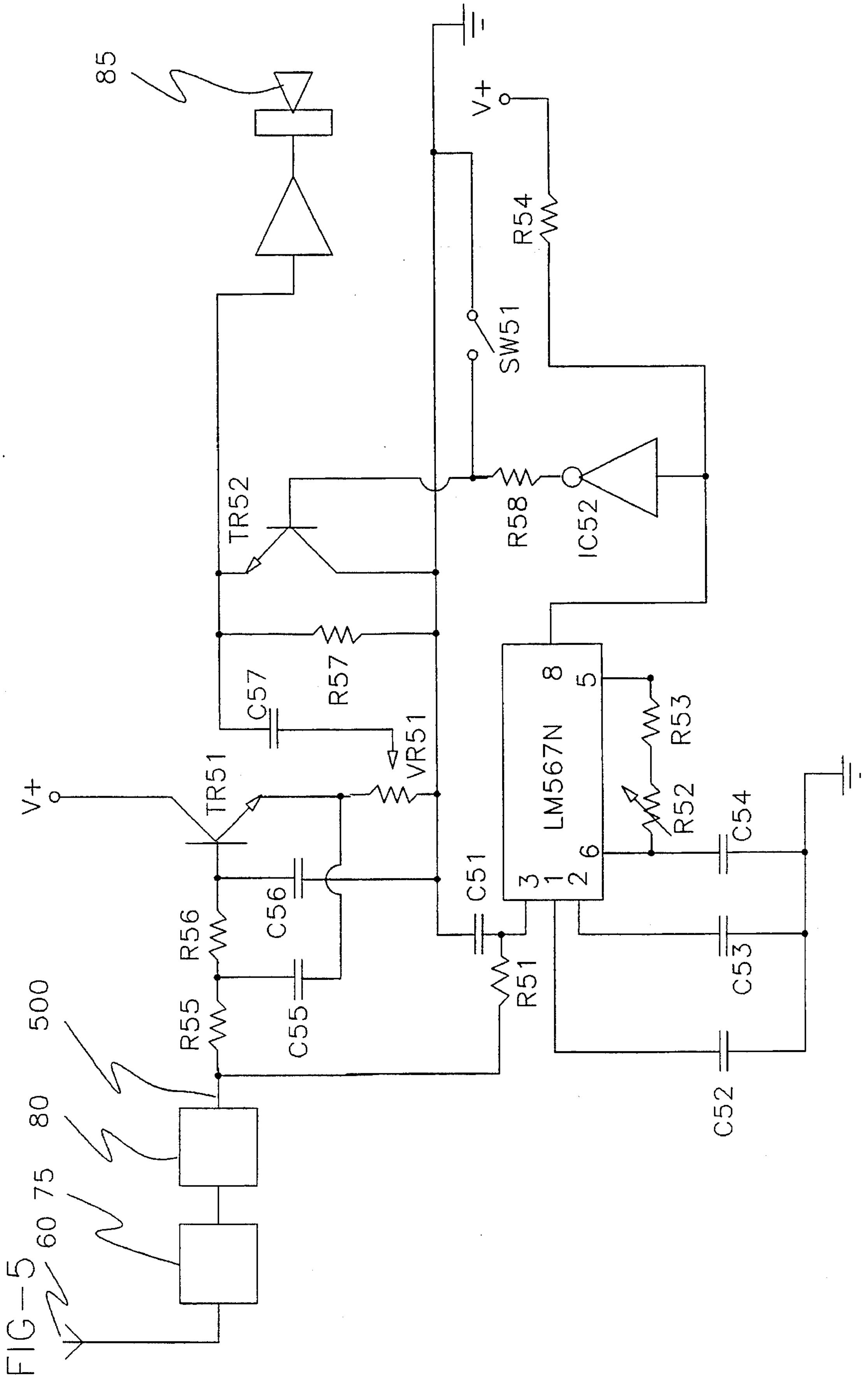

An alternative embodiment of the invention is shown in FIGS. 4 and 5. In this embodiment, a control signal or hidden tone is generated by the monitoring unit and sent along with the reassurance tone to cause the reassurance tone to be selectively blanked by the receiving unit. The control signal mutes the receiver for a period before and after the reassurance tone is transmitted. If the interval when the blanking pulse is active is short, it is very difficult to detect that a short hole is placed in the received audio spectrum. This technique allows the reassurance tone to be any frequency as opposed to having it near the upper part of the audio spectrum as in the embodiment previously described.

Referring now to FIG. 4, which is an electrical schematic diagram of another embodiment of a tone generator 90 of FIG. 1, a pair of audio oscillators are employed, one for generating a reassurance tone in accordance with the present invention, the other for generating a control signals or hidden tones that will be used in the matching receiver for selectively blocking the reassurance tone.

Figure 6:
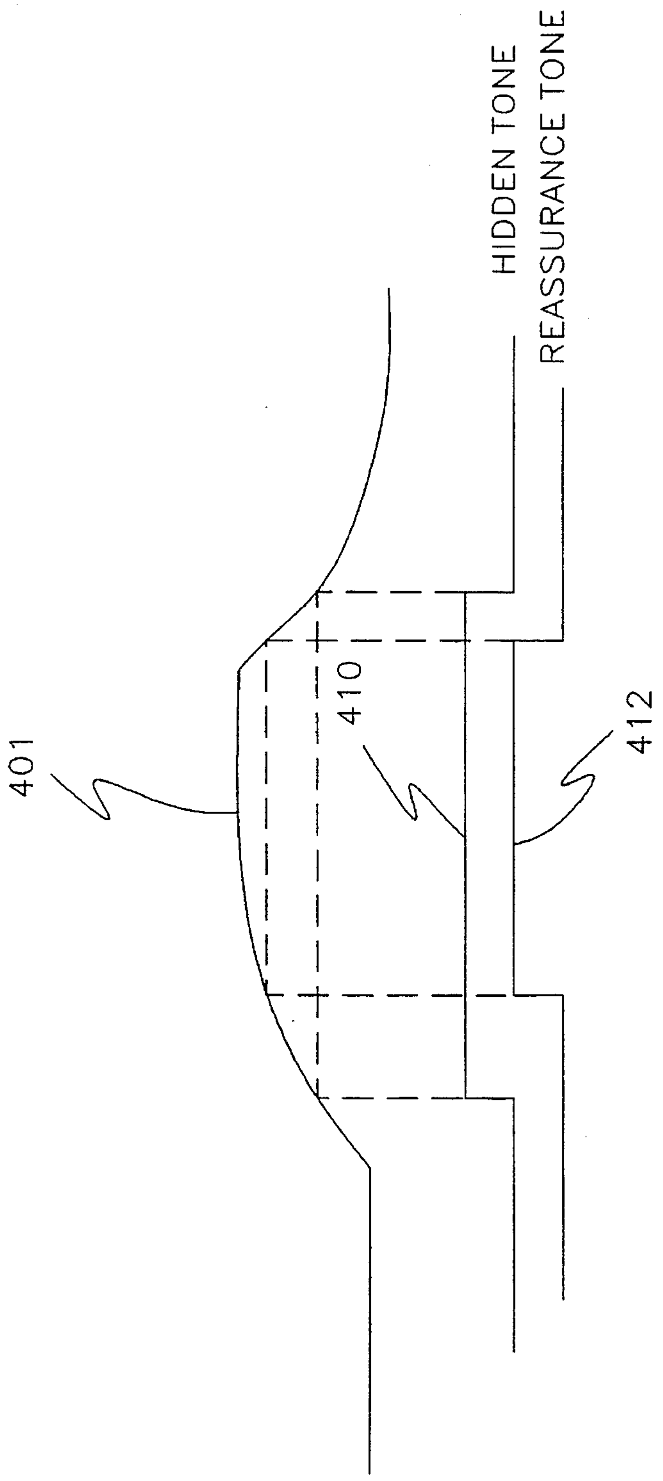
FIG. 6 is a waveform diagram showing the relationship among the output audio signal from the transmitter, the hidden tone and the reassurance tone.

A free running oscillator made from the schmitt inverter IC41 produces positive pulses of typically 100 mS duration at intervals of typically 5 seconds at point 400. These are fed to the pair of transistors TR41 and TR42 which allow capacitor C42 to charge through resistor R45 and discharge through resistor R46. With the proper choice of values, a waveform 401 of the shape shown in FIG. 6 is produced across capacitor C42 at point 402. The comparators IC42, IC43 and IC44 respond to this waveform to produce two pulses 410 and 412, with pulse 410 straddling pulse 412 as shown in FIG. 6.

The pulse 410 from IC44 is used to drive a hidden tone oscillator 415. A hidden tone is produced by a stable tone generator and is detected at the receiver using a phase-locked loop (PLL). When the PLL is locked, the receiver is muted and conversely, when the PLL is unlocked, the receiver is unmuted. The frequency of the hidden tone can be chosen to suit the application and in the preferred embodiment of the invention, it is placed at approximately 8 kHz, higher than the bandpass of the receiver's audio circuits, thus making it inaudible. The response time of the receiver to lock onto this hidden tone is typically in the order of 30 milliseconds.

The hidden tone oscillator 415 includes a LM567 tone generator for the same reasons as previously described. It is made adjustable using VR41 so that it can be matched to the PLL in the associated receiver.

The hidden tone oscillator is not turned on and off but instead is shifted in frequency by a small amount using diode D42 and resistor R413. Shifting the frequency away from the specified hidden tone frequency has the same effect as turning it off because the PLL in the receiver, upon losing the desired 8 kHz tone, will indicate that an unlocked condition then occurs and will unmute the audio output.

The pair of comparators IC42 and IC43 are arranged as a window detector and are used to turn a reassurance tone oscillator 420 ON via diode D43. Oscillator 420 uses a schmitt inverter IC45 in conjunction with frequency determining resistor R19 and capacitor C6.

Oscillators 415 and 420 are filtered by respective networks, R416/C44 and R421/C48 and their relative amplitudes are adjusted by R417 and R418. The composite waveform containing the hidden tone and the reassurance tone is then applied to the transmitter modulator.

FIG. 5 is an electrical schematic diagram of a part of a receiver to be used with the transmitter of FIG. 4. The receiver includes a detector to detect the hidden tone and selectively to mute the loudspeaker whenever the hidden tone is present, thus preventing the reassurance tone from being heard.

As in FIG. 3, radio frequency energy from the monitoring unit 10 is received by antenna 60, amplified by radio frequency section 75, and applied to the demodulator circuit 80. In this embodiment of the invention, the audio signals are frequency modulated, so the demodulator circuit 80 is typically a frequency discriminator.

A composite waveform appears at point 500, the demodulated output of circuit 80. This waveform contains the audio sounds picked up by microphone 25, a hidden tone at approximately 8 kHz, whose frequency shifts for a brief period at regular intervals to fall within the lock range of the receiver PLL, an intermittent reassurance tone at any desired audible frequency and any intermediate frequency components, if the receiver is configured for FM reception.

High frequency noise is filtered by resistor R51 and capacitor C51 and applied to a phase-locked or PLL circuit IC51. This is a commercially available LM567 whose nominal center frequency is set by C54, R52 and R53. Capacitors C52 and C53 determine the pull-in bandwidth of the PLL and its response time. Indication of lock status is given at pin 8, which goes low when the PLL is locked to the hidden tone.

The detected presence of the hidden tone is used to mute the receiver audio path using transistor TR52 so that the reassurance tone is blanked out unless this function is bypassed by user operated switch SW51. The lock condition causes IC51 pin 8 to go low. This causes IC52 output to go high which turns on the clamp transistor TR52 via resistor R58. If the user wants to hear the reassurance tone, switch SW51 is closed and transistor TR52 can no longer mute the audio path.

The audio path from the receiver goes through an active low pass filter comprising R55, R56, C55, C56 and TR51. This removes high frequency noise while at the same time also attenuating any residual hidden tone audio.

It will be seen that the correct relative timing between the hidden tone and the reassurance tone at the transmitter is necessary to ensure that lock is correctly established at the receiver before the reassurance tone starts. The relative timing of these signals is shown in FIG. 6.

The continuous transmission of a hidden tone and its detection by the PLL provides an important means of checking that the complete radio system is working. In the system described, every ten seconds the PLL should lock (upon receipt of the hidden tone). If this fails to happen, an alarm can be raised at the receiver using a retriggerable monostable to warn the user that some sort of system problem has occurred, as for example, out of range, power failure at the transmitter etc.

Figure 7:
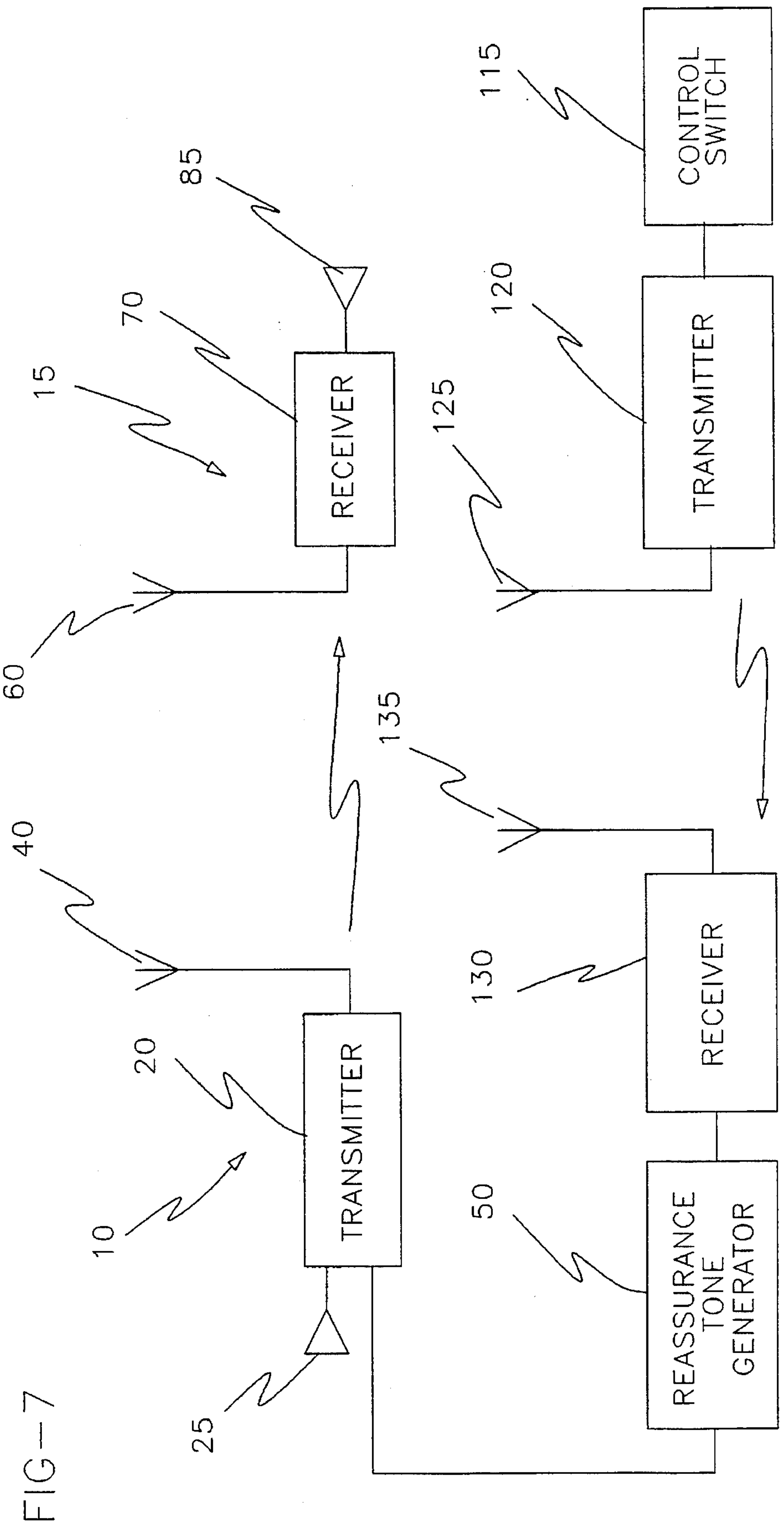
FIG. 7 is an electrical block diagram of another embodiment of the invention wherein the reassurance tone sent by the monitoring transmitter is controlled by the receiver.

FIG. 7 shows a voice operated monitoring unit wherein a voice actuated relay 100 responds to audio above a predetermined level being received by the microphone 25 to turn on the transmitter. This arrangement is often used to conserve battery power since the transmitter will not be turned on unless there is sufficient audio present. The corresponding receiver would normally include a squelch circuit. The present invention permits the transmitter to be activated from time to time to check its proper operation, and the use of the hidden tone in conjunction with the reassurance tone prevents the annoyance of the so-called squelch tails that would be otherwise be heard using other techniques.

FIG. 8 is an electrical block diagram of another embodiment of the invention wherein the reassurance tone sent by the monitoring transmitter is controlled by the receiver. In this embodiment of the invention, the receiving unit 15 includes a control switch 115 and a transmitter 120 connected to an antenna 125 which transmits a control signal to a receiver 130 connected to antenna 135 in the monitoring unit 10. The transmitter 120 and receiver 130 are tuned to the same frequency, one that is different from and non-interfering with the transmitter in the monitoring unit. When a control signal is received, then a reassurance tone from tone generator 50 will be sent through the monitoring unit 10 to the receiving unit 15. Thus, in this embodiment, the generation of a reassurance tone is completely controlled by the user who selects the position of the switch 115.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A wireless monitoring system comprising:

a transmitter including an audio pickup device for monitoring ambient sounds and means for transmitting said ambient sounds, a tone generator for causing said transmitter to transmit an occasional audible reassurance tone, a receiver tuned to receive the ambient sounds monitored by said transmitter, and said receiver including means for receiving said reassurance tone, and means associated with said receiver for selectively controlling the monitoring of said reassurance tone while continuing to monitor said ambient sounds.

2. A wireless sound monitoring system comprising:

a monitoring unit, said monitoring unit including:

a microphone, a transmitter connected to said microphone for broadcasting on a radio frequency signal ambient sounds picked up near the monitoring unit, and a tone generator for causing said transmitter to broadcast on said radio frequency signal short duration, fixed frequency reassurance tones; and a receiving unit, said receiving unit including:

a receiver tuned to the radio frequency signal from said transmitter, means within said receiver for detecting and converting the ambient sounds and reassurance tones contained in said radio frequency signal into an audio output signal, and means for selectively removing from said audio output signal said reassurance tones.

3. The wireless sound monitoring system of claim 2 wherein said tone generator includes:

a tone generating circuit for producing said reassurance tone, and a timing circuit for causing said reassurance tone to be applied to said transmitter for short periods of time at regular intervals.

4. The wireless sound monitoring system of claim 3 wherein said short period of time is approximately 0.2 seconds in length and wherein said regular intervals are every ten seconds.

5. The wireless monitoring system of claim 2 wherein said means for selectively removing said reassurance tones includes:

a notch filter tuned to the frequency of said reassurance tones, and a switch for enabling said notch filter to remove said reassurance tones from said audio output signal of said means for detecting and converting.

6. The wireless monitoring system of claim 2 wherein said transmitter includes means for generating control signals substantially simultaneously with said reassurance tones; and wherein said means for selectively removing said reassurance tones includes:

means for detecting said control signals, and means for muting said audio output signal during an interval when said control signals are present.

7. The wireless sound monitoring system of claim 6 wherein said receiver includes a loudspeaker and a low pass filter for preventing audio signals above a predetermined frequency from being applied to said loudspeaker; and wherein said control signals are high frequency audio signals above said predetermined frequency.

8. The wireless sound monitoring system of claim 2 wherein said monitoring unit further includes a voice actuated relay circuit responsive to ambient audio sounds above a predetermined amplitude for causing said transmitter to emit radio frequency signals.

9. The wireless monitor system of claim 2 wherein said receiving unit includes a control transmitter for generating a control signal, a muting switch for controlling the operation of said control transmitter, a control receiver within said monitoring unit tuned to the frequency of said control transmitter, and circuit means connected to said control receiver and responsive to said control signal generated by said control transmitter for controlling the operation of said tone generator.

10. A monitoring unit for use in a wireless monitoring system including a receiver unit, said monitoring unit comprising:

an audio pickup device for receiving ambient sounds near of said monitoring unit, a signal generator for generating a reassurance signal, a transmitter for transmitting said ambient sounds and said reassurance signal on a radio frequency signal from said monitoring unit to a receiver unit; and wherein said reassurance signal comprises a signal for indicating that said monitoring unit is operable to transmit said ambient sounds to said receiver unit.

11. The wireless sound monitoring system of claim 10 wherein said reassurance signal comprises a fixed frequency tone.

12. The monitoring unit of claim 10 wherein said reassurance signal comprises a plurality of signals transmitted at predetermined spaced intervals.

13. A method of monitoring ambient sounds at a predetermined location using a wireless sound monitoring system comprising the steps of:

placing a monitoring unit at said predetermined location, providing a receiver unit in spaced relation to said monitoring unit, receiving ambient sounds near said monitoring unit and transmitting said ambient sounds from said monitoring unit to said receiver unit on a radio frequency signal, generating and transmitting a reassurance signal from said monitoring unit, receiving said reassurance signal at said receiver unit whereby operation of said wireless sound monitoring system is verified; and wherein said receiver unit provides an indication of said reassurance signal being received at said receiver unit and further including the step of disabling, at said monitoring unit, said transmission of said reassurance signal while continuing to transmit said ambient sounds from said monitoring unit to said receiver unit on said radio frequency signal.

14. A wireless sound monitoring system comprising:

a monitoring unit including a reassurance signal generator for generating a reassurance signal and an audio pickup device for receiving ambient sounds near said monitoring unit, and a transmitter for transmitting said reassurance signal and said ambient sounds on a radio frequency signal, a receiver unit for receiving said radio frequency signal, said receiver unit including means for indicating a condition wherein said reassurance signal is not received by said receiver unit; and wherein said receiver unit includes means for selectively controlling said means for indicating said condition whereby said means for indicating said condition is disabled while continuing to monitor said ambient sounds.

15. The wireless sound monitoring system of claim 14 wherein said reassurance signal comprises a short duration, fixed frequency signal.

16. A method of monitoring ambient sounds at a predetermined location using a wireless sound monitoring system comprising the steps of:

placing a monitoring unit at said predetermined location, providing a receiver unit in spaced relation to said monitoring unit, receiving ambient sounds near said monitoring unit and transmitting said ambient sounds from said monitoring unit to said receiver unit on a radio frequency signal, generating and transmitting a reassurance signal from said monitoring unit, receiving said reassurance signal at said receiver unit whereby operation of said wireless sound monitoring system is verified; and wherein said receiver unit provides an indication of said reassurance signal being received at said receiver unit and further including the step of disabling, at said receiver unit, and indication of said reassurance signal being received while continuing to monitor said ambient sounds transmitted from the monitoring unit.

17. The method of claim 16 including the step of filtering said reassurance signal from said ambient sounds at said receiver unit.

18. The method of claim 16 further including the step of:

said receiver unit converting said radio frequency signal into an audio output signal corresponding to said ambient sounds.

19. The method of claim 18 wherein said receiver unit continues to convert said radio frequency signal into said audio output signal corresponding to said ambient sounds after said step of disabling said indication of said reassurance signal being received.

* * * * *